United States Patent
Agarwal et al.

(10) Patent No.: US 11,748,798 B1
(45) Date of Patent: Sep. 5, 2023

(54) METHOD AND APPARATUS FOR ITEM SELECTION

(71) Applicant: Groupon, Inc., Chicago, IL (US)

(72) Inventors: Nipun Agarwal, Fremont, CA (US); Sushant Wason, Chicago, IL (US)

(73) Assignee: Groupon, Inc., Chicago, IL (US)

( * ) Notice: Subject to any disclaimer, the term of this patent is extended or adjusted under 35 U.S.C. 154(b) by 624 days.

(21) Appl. No.: 14/843,170

(22) Filed: Sep. 2, 2015

(51) Int. Cl.
*G06Q 30/00* (2023.01)
*G06Q 30/0601* (2023.01)

(52) U.S. Cl.
CPC ..... *G06Q 30/0631* (2013.01); *G06Q 30/0633* (2013.01)

(58) Field of Classification Search
CPC .............. G06Q 30/0631; G06Q 30/0633
See application file for complete search history.

(56) References Cited

U.S. PATENT DOCUMENTS

| | | | |
|---|---|---|---|
| 7,295,990 B1 | 11/2007 | Braumoeller et al. | |
| 7,526,458 B2* | 4/2009 | Flinn | G06Q 30/0185 706/12 |
| 7,720,720 B1* | 5/2010 | Sharma | G06Q 30/02 705/26.7 |
| 7,921,071 B2* | 4/2011 | Hicks | G06N 5/02 706/52 |
| 7,979,322 B2* | 7/2011 | Stoppelman | G06Q 30/0255 705/26.7 |
| 8,209,242 B1 | 6/2012 | Henderson et al. | |
| 8,301,623 B2* | 10/2012 | Chakrabarti | G06F 16/9535 707/723 |
| 8,666,909 B2* | 3/2014 | Pinckney | G06N 20/00 706/11 |
| 9,135,573 B1* | 9/2015 | Rodriguez | G06F 17/16 |

(Continued)

FOREIGN PATENT DOCUMENTS

WO    WO-02067086 A2 *   8/2002   ............. G06Q 30/02

OTHER PUBLICATIONS

"Research and Application of Personalized Modeling Based on Individual Interest in Mining," by Baocheng Huang and Guang Yu, Hindawi Publishing Corporation, Abstract and Applied Analysis, vol. 2014, Aug. 5, 2014 (Year: 2014).*

(Continued)

*Primary Examiner* — Anne M Georgalas
(74) *Attorney, Agent, or Firm* — Alston & Bird LLP

(57) ABSTRACT

The present disclosure relates to methods, systems, and apparatuses for determining item recommendations and receiving dynamic modifications to an item recommendation algorithm. The method includes receiving electronic data indicating a set of items, generating, using a recommendation engine executing on a processor, a first set of one or more item recommendations from the set of items, causing a client interface to be generated, the client interface comprising the one or more item recommendations and a plurality of interface controls, wherein selection of one of the plurality of interface controls causes a weight adjustment indication to be transmitted for at least one of the plurality of weights, receiving the weight adjustment indicator, adjusting at least one weight of the plurality of weights associated with the weight adjustment indicator, and generating a second set of one or more item recommendations using the adjusted at least one weight.

19 Claims, 6 Drawing Sheets

(56) References Cited

U.S. PATENT DOCUMENTS

| | | | |
|---|---|---|---|
| 9,691,035 B1* | 6/2017 | Sandler | G06Q 30/0631 |
| 10,127,596 B1* | 11/2018 | Franke | G06Q 30/0631 |
| 10,271,103 B2* | 4/2019 | Kaya | H04N 21/25891 |
| 2003/0163399 A1* | 8/2003 | Harper | G06Q 10/087 |
| | | | 705/35 |
| 2004/0260781 A1* | 12/2004 | Shostack | G06Q 30/02 |
| | | | 709/207 |
| 2005/0189414 A1 | 9/2005 | Fano et al. | |
| 2006/0282304 A1* | 12/2006 | Bedard | G06Q 30/0204 |
| | | | 705/7.29 |
| 2007/0061226 A1 | 3/2007 | Ajiki et al. | |
| 2008/0147635 A1* | 6/2008 | Im | G06F 16/951 |
| | | | 707/999.005 |
| 2009/0006368 A1* | 1/2009 | Mei | H04N 21/4667 |
| | | | 707/999.005 |
| 2010/0058383 A1* | 3/2010 | Chang | H04N 21/47815 |
| | | | 725/35 |
| 2010/0070338 A1 | 3/2010 | Siotia et al. | |
| 2010/0161619 A1* | 6/2010 | Lamere | G06Q 10/00 |
| | | | 707/749 |
| 2010/0223211 A1* | 9/2010 | Johnson | G06Q 10/0637 |
| | | | 706/11 |
| 2011/0052001 A1 | 3/2011 | Tan et al. | |
| 2011/0307478 A1* | 12/2011 | Pinckney | G06F 16/583 |
| | | | 707/724 |
| 2012/0330778 A1* | 12/2012 | Eastham | G06Q 30/02 |
| | | | 705/26.7 |
| 2013/0211927 A1* | 8/2013 | Kellogg | G06Q 30/0631 |
| | | | 705/14.73 |
| 2014/0067596 A1* | 3/2014 | McGovern | G06Q 30/0246 |
| | | | 705/26.7 |
| 2014/0122502 A1* | 5/2014 | Kalmes | G06F 16/284 |
| | | | 707/748 |
| 2014/0156466 A1 | 6/2014 | Westphal | |
| 2014/0298025 A1* | 10/2014 | Burbank | H04L 51/32 |
| | | | 713/171 |
| 2014/0379520 A1* | 12/2014 | Nemery | G06Q 30/0631 |
| | | | 705/26.7 |
| 2016/0086104 A1* | 3/2016 | Wouhaybi | G06Q 50/01 |
| | | | 705/5 |
| 2016/0173633 A1* | 6/2016 | Bax | H04L 67/567 |
| | | | 709/219 |
| 2016/0225061 A1* | 8/2016 | Bao | G06Q 30/0631 |

OTHER PUBLICATIONS

"Recommender systems based on user reviews: the state of the art," by Li Chen, Guanliang Chen, and Feng Wang, User Modeling and User-Adapted Interaction, 25:99-154, Jan. 22, 2015 (Year: 2015).*

U.S. Appl. No. 14/219,349, filed Mar. 19, 2014; In re: Ayars et al., entitled *Method and Apparatus for Generating an Electronic Communication.*

U.S. Appl. No. 14/843,048, filed Sep. 2, 2015; In re: Gaurav et al., entitled *Method and Apparatus for Managing Item Inventories.*

U.S. Appl. No. 62/098,987, filed Dec. 31, 2014; In re: Violette et al., entitled *Methods and Systems for Managing Transmission of Electornic Marketing Communications.*

* cited by examiner

METHOD AND APPARATUS FOR ITEM SELECTION

TECHNOLOGICAL FIELD

Example embodiments of the present invention relate generally to item selection systems and, more particularly, to methods, systems, and apparatuses for recommending items based on dynamic recommendation algorithms that receive factor weight adjustments from client devices of a product marketing and ordering system.

BACKGROUND

The applicant has discovered problems with current methods, systems, and apparatuses for selecting and recommending items. Through applied effort, ingenuity, and innovation, Applicant has solved many of these identified problems by developing a solution that is embodied by the present invention, which is described in detail below.

BRIEF SUMMARY

Accordingly, a method, apparatus, and computer program product to provide data-driven item recommendations. Example embodiments may include methods, apparatuses, and computer program products. An example of a method for generating electronic marketing communications. The method includes receiving electronic data indicating a set of items, generating, using a recommendation engine executing on a processor, a first set of one or more item recommendations from the set of items. The recommendation engine employing a recommendation algorithm that determines the item recommendations by at least evaluating a plurality of factors for one or more items of the set of items, applying a respective plurality of weights to each of the plurality of factors, generating a factor score for each of the plurality of factors, adjusting the factor score for each factor using at least one of the plurality of weights associated with the factor to generate one or more adjusted factor scores, and determining an item score for the one or more items of the set of items using the adjusted factor scores. The method also includes causing a client interface to be generated, the client interface comprising the one or more item recommendations and a plurality of interface controls, wherein selection of one of the plurality of interface controls causes a weight adjustment indication to be transmitted for at least one of the plurality of weights, receiving the weight adjustment indicator, adjusting at least one weight of the plurality of weights associated with the weight adjustment indicator, and generating a second set of one or more item recommendations using the adjusted at least one weight.

The method may include causing the second set of one or more item recommendations to be presented in the client interface. Adjusting the at least one weight may include multiplying the at least one weight by a percentage value. The client interface may be a web page. The set of items may be filtered by an inventory management system to determine an inventory level prior to generating the first set of one or more item recommendations, and each of the set of items may exceed a threshold inventory level. The factors may include at least one of a location score, a sales metric score, and a user profile score. The method may also include storing the adjusted at least one weight with a user profile.

Embodiments also include an apparatus for generating electronic marketing communications. The apparatus includes recommendation circuitry, interface generation circuitry, and feedback circuitry. The recommendation circuitry is configured to receive electronic data indicating a set of items, and generate a first set of one or more item recommendations from the set of items. The recommendation engine is configured to employ a recommendation algorithm that determines the item recommendations by at least evaluating a plurality of factors for one or more items of the set of items, applying a respective plurality of weights to each of the plurality of factors, generating a factor score for each of the plurality of factors, adjusting the factor score for each factor using at least one of the plurality of weights associated with the factor to generate one or more adjusted factor scores, and determining an item score for the one or more items of the set of items using the adjusted factor scores. The recommendation circuitry is further configured to adjust at least one weight of the plurality of weights associated with a weight adjustment indicator, and generate a second set of one or more item recommendations using the adjusted at least one weight. The interface generation circuitry is configured to cause a client interface to be generated, the client interface comprising the one or more item recommendations and a plurality of interface controls, wherein selection of one of the plurality of interface controls causes the weight adjustment indication to be transmitted for at least one of the plurality of weights. The feedback circuitry is configured to receive the weight adjustment indicator, and provide the weight adjustment indicator to the recommendation circuitry.

The interface generation circuitry may be further configured to cause the second set of one or more item recommendations to be presented in the client interface. Adjusting the at least one weight may include multiplying the at least one weight by a percentage value. The client interface may be a web page. The set of items may be filtered by an inventory management system to determine an inventory level prior to generating the first set of one or more item recommendations, and each of the set of items may exceed a threshold inventory level. The factors may include at least one of a location score, a sales metric score, and a user profile score. The recommendation circuitry may be further configured to store the adjusted at least one weight with a user profile.

Embodiments also include an apparatus for generating electronic marketing communications. The apparatus includes means for receiving electronic data indicating a set of items, and means for generating a first set of one or more item recommendations from the set of items. The recommendation engine is configured to employ a recommendation algorithm that determines the item recommendations by at least evaluating a plurality of factors for one or more items of the set of items, applying a respective plurality of weights to each of the plurality of factors, generating a factor score for each of the plurality of factors, adjusting the factor score for each factor using at least one of the plurality of weights associated with the factor to generate one or more adjusted factor scores, and determining an item score for the one or more items of the set of items using the adjusted factor scores. The apparatus also includes means for adjusting at least one weight of the plurality of weights associated with a weight adjustment indicator, means for generating a second set of one or more item recommendations using the adjusted at least one weight, and means for causing a client interface to be generated. The client interface includes the one or more item recommendations and a plurality of interface controls, wherein selection of one of the plurality of interface controls causes the weight adjustment indication to be transmitted for at least one of the plurality of weights.

The apparatus also includes means for receiving the weight adjustment indicator, and means for providing the weight adjustment indicator to the recommendation circuitry.

The means for causing the client interface to be generated may be further configured to cause the second set of one or more item recommendations to be presented in the client interface. Adjusting the at least one weight may include multiplying the at least one weight by a percentage value. The client interface may be a web page. The apparatus may also include means for filtering the set of items to determine an inventory level prior to generating the first set of one or more item recommendations, and each of the set of items may exceed a threshold inventory level. The factors may include at least one of a location score, a sales metric score, and a user profile score.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
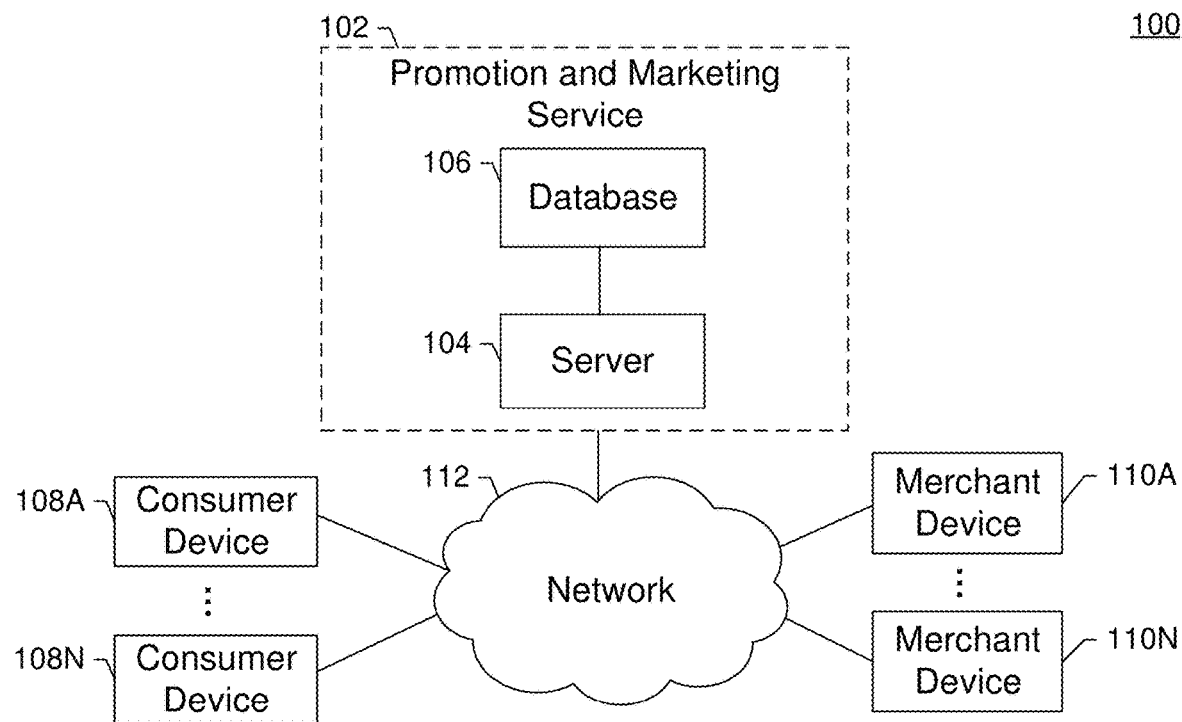
Figure 2:
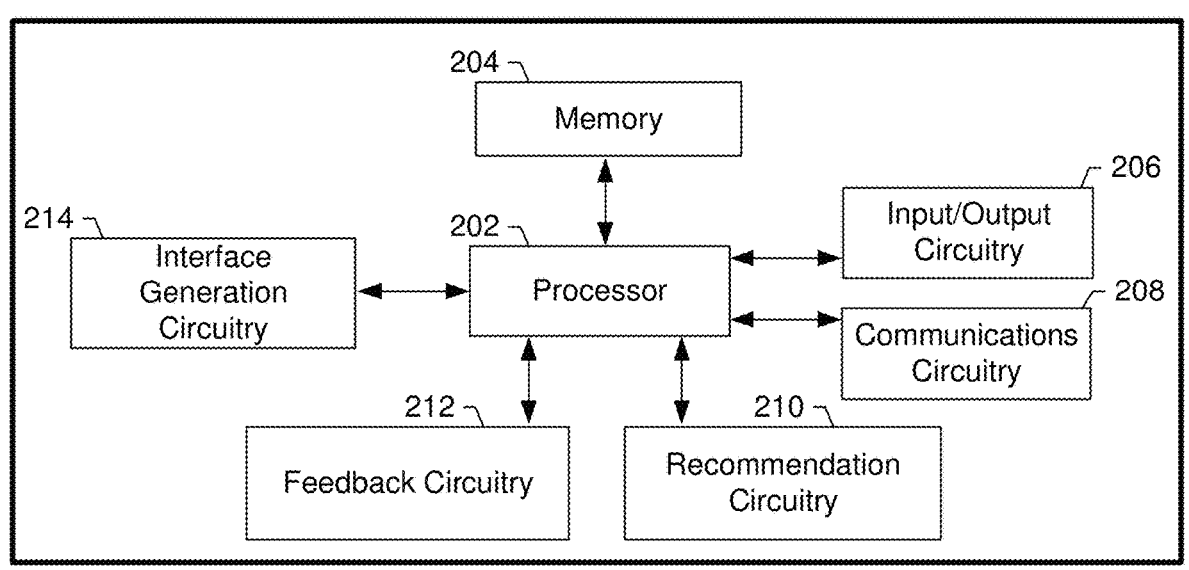
Figure 3:
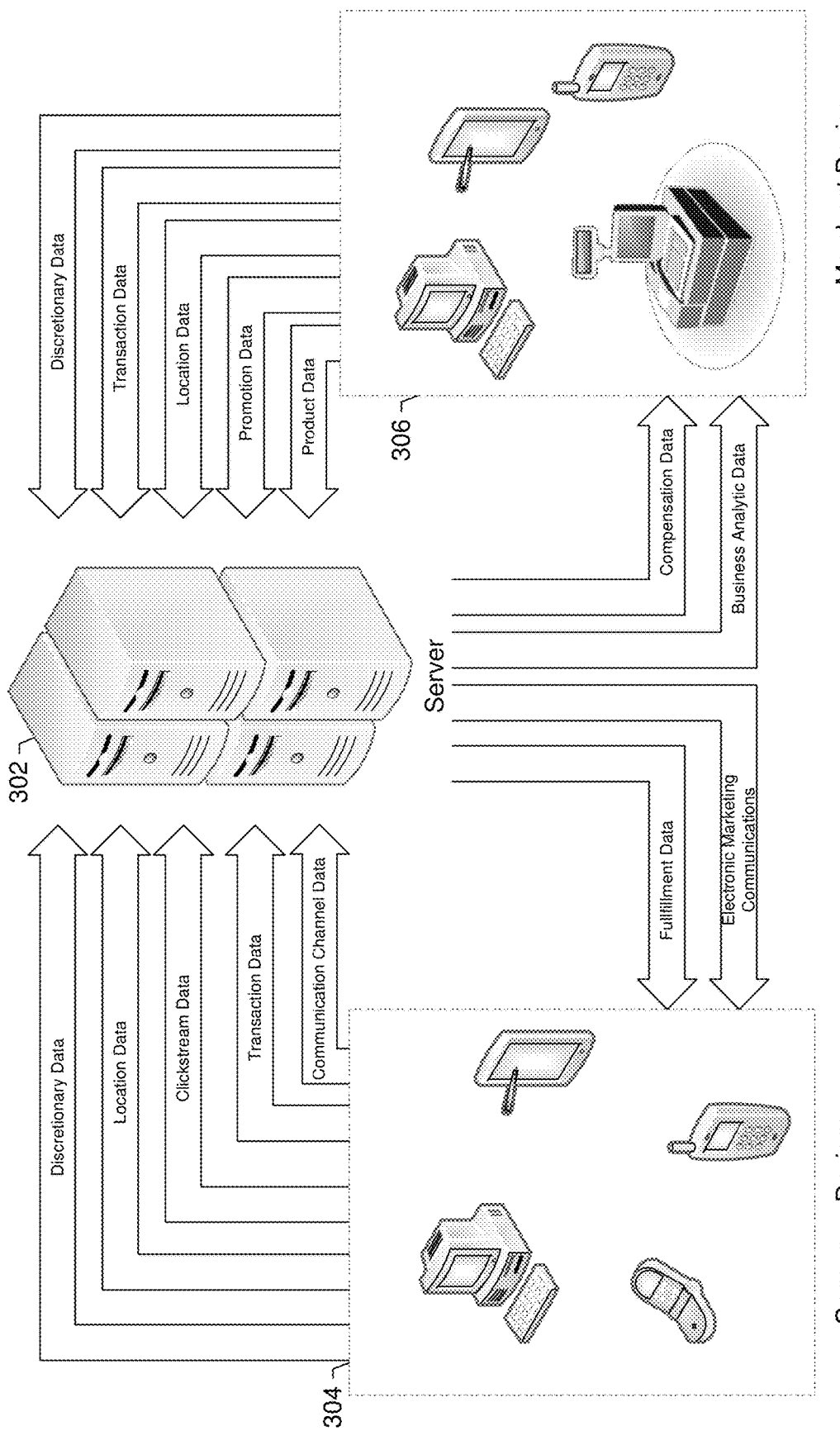
Figure 4:
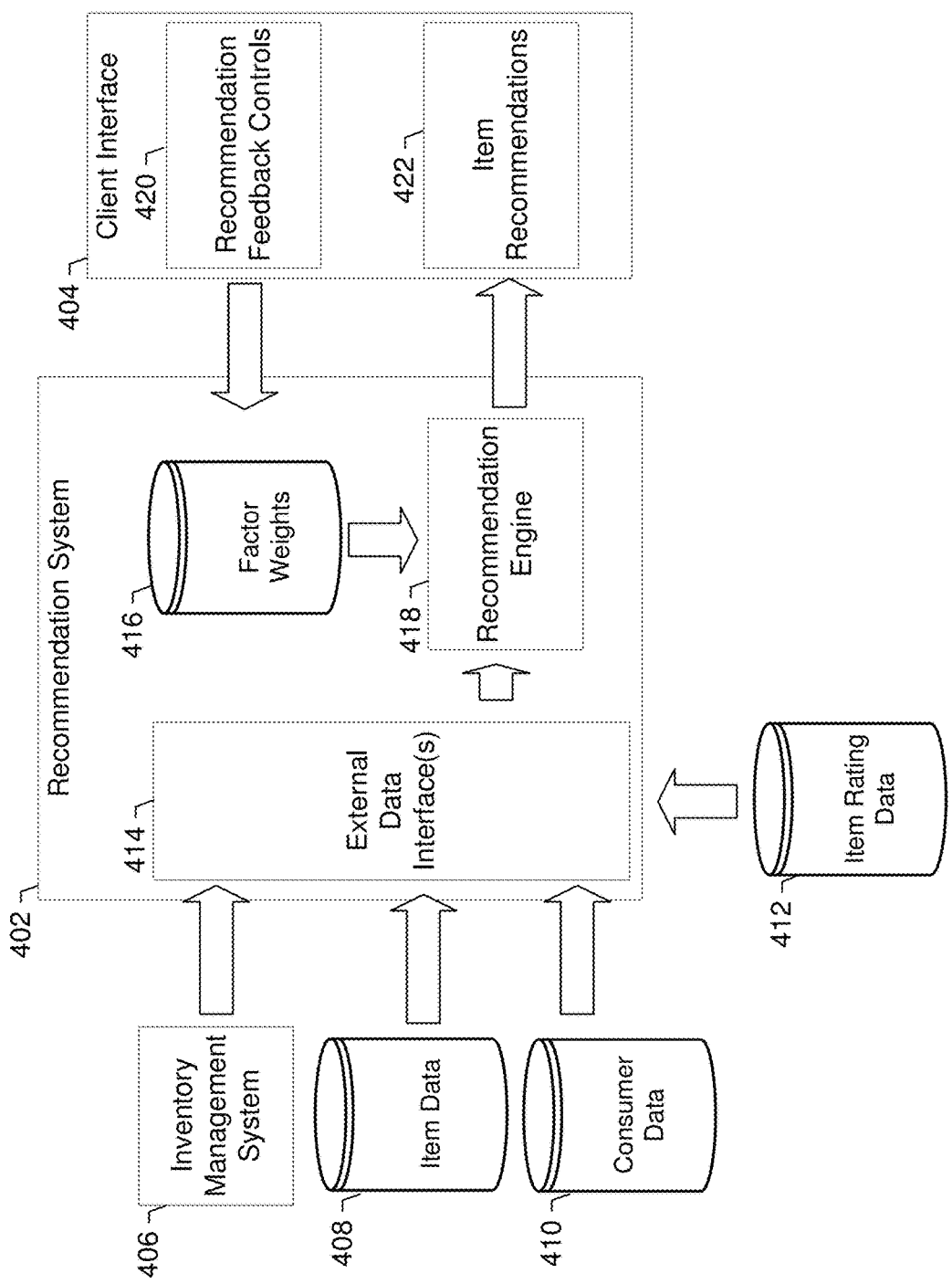
Figure 5:
Figure 6:
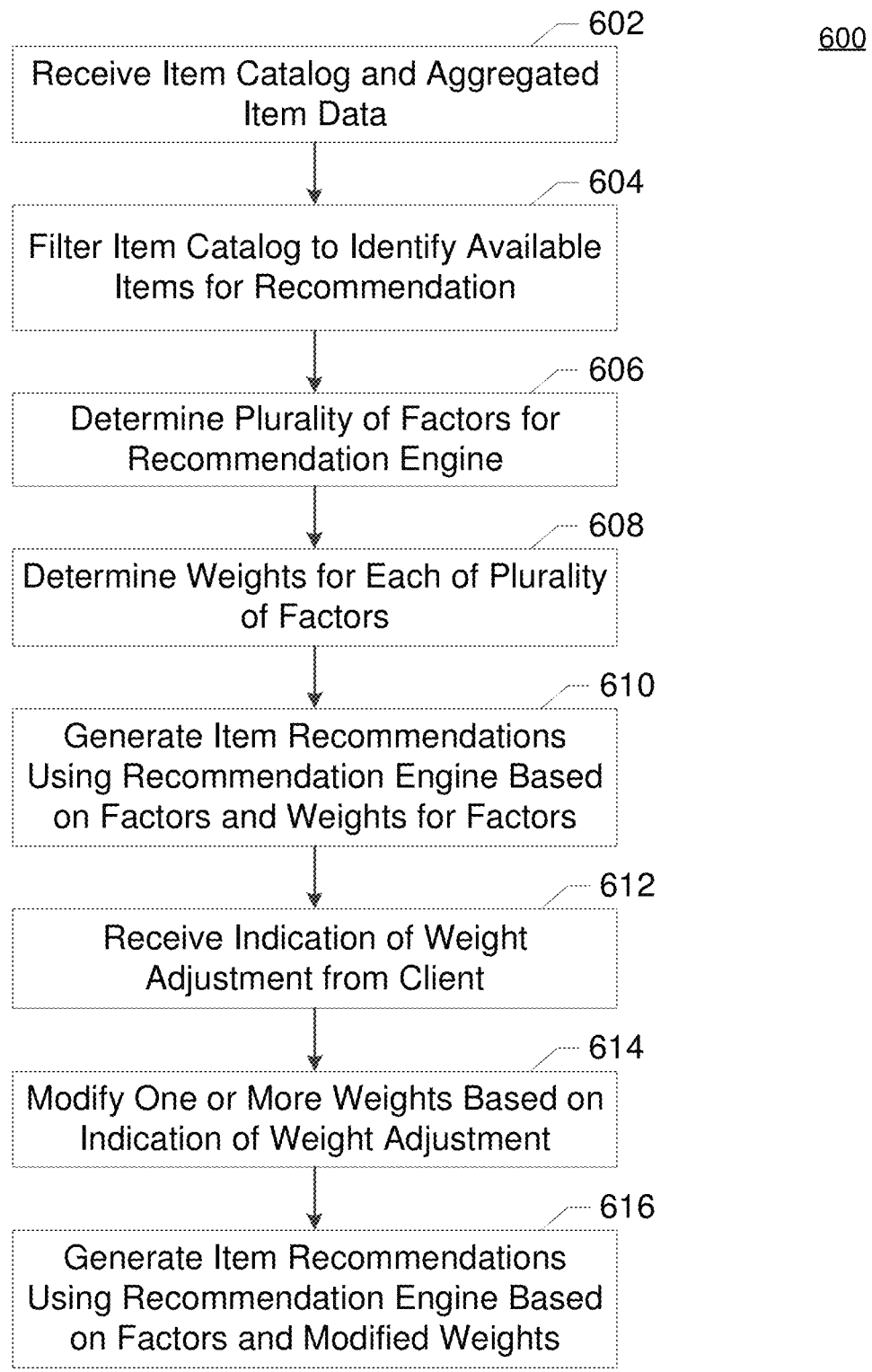
Figure 7:
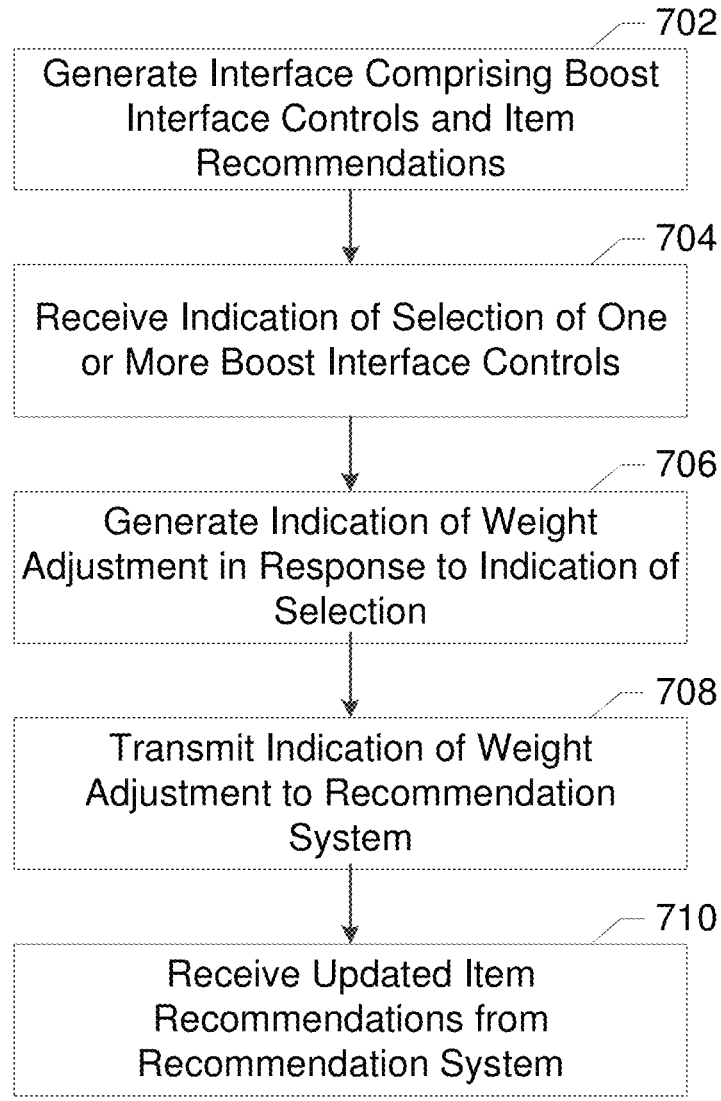

Having thus described certain example embodiments of the present disclosure in general terms, reference will now be made to the accompanying drawings, which are not necessarily drawn to scale, and wherein:

FIG. 1 illustrates an example system within which some embodiments of the present invention may operate;

FIG. 2 illustrates a block diagram of an example device for implementing a promotion recommendation engine using special-purpose circuitry in accordance with some embodiments of the present invention;

FIG. 3 illustrates an example of a data flow among a consumer device, a server, and a merchant device in accordance with some embodiments of the present invention;

FIG. 4 illustrates an example of a data flow interaction between elements of an example device for implementing a dynamic item recommendation engine capable of receiving weight adjustments from a client interface in accordance with some embodiments of the present invention;

FIG. 5 illustrates an example of an illustration of a client interface for providing indications of weight adjustments and receiving item recommendations in accordance with embodiments of the present invention;

FIG. 6 illustrates a flowchart describing example operations for implementing a recommendation engine that receives weight adjustments from a client interface in accordance with some embodiments of the present invention; and FIG. 7 illustrates a flowchart describing example operations for providing an indication of a weight adjustment to alter a set of item recommendations in accordance with some embodiments of the present invention.

DETAILED DESCRIPTION

Overview

Various embodiments of the present invention are directed to improved apparatuses, methods, and computer readable media for recommending items. In this regard, embodiments of the present invention provide systems, devices, and frameworks that employ recommendation engines which are capable of receiving feedback from client interfaces to adjust weighting parameters that affect which items are recommended. Embodiments may reinitialize or repeat a recommendation process using the adjusted weighting parameters and generate new interfaces that take into account recommendations generated based on the adjusted weighting parameters. In this manner, users may be provided with interface controls that allow them to dynamically adjust the process by which particular items are recommended to them, improving the quality and efficiency of their interactions with electronic content.

Embodiments may also provide data aggregation and filtering components which assist with selecting particular products for evaluation by a recommendation engine. For example, embodiments may include components that aggregate product ratings, item inventories, item sales figures, and user-specific item characteristics and convert this data into a format suitable for analysis by a recommendation engine.

The recommendation engine may convert each data type into a separate factor and assign a weight to that particular factor. When generating item recommendations, the recommendation engine may determine a score for each item, where the score includes components based on each factor. The contribution of the factor to the score may be determined according to the weight assigned to the factor.

It should be readily appreciated that the embodiments of the methods, systems, devices, and apparatuses for managing an inventory of items may be configured in various additional and alternative manners to provide dynamic item recommendations to client interfaces based on indicators of weight adjustments received via those client interfaces within the context of a promotion and marketing service as described herein.

Definitions

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" may include a service that is accessible via one or more computing devices and that is operable to provide promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like. The service is also, in some example embodiments, configured to offer merchant services such as promotion building (e.g., assisting merchants with selecting parameters for newly created promotions), promotion counseling (e.g., offering information to merchants to assist with using promotions as marketing), promotion analytics (e.g., offering information to merchants to provide data and analysis regarding the costs and return-on-investment associated with offering promotions), and the like.

As used herein, the terms "provider" and "merchant" may be used interchangeably and may include, but are not limited to, a business owner, consigner, shopkeeper, tradesperson, vendor, operator, entrepreneur, agent, dealer, organization or the like that is in the business of a providing a good, service or experience to a consumer, facilitating the provision of a good, service or experience to a consumer and/or otherwise operating in the stream of commerce. The "provider" or "merchant" need not actually market a product via the promotion and marketing service, as some merchants or providers may utilize the promotion and marketing service only for the purpose of gathering marketing information, demographic information, or the like.

As used herein, the term "consumer" should be understood to refer to a recipient of goods, services, promotions, media, or the like provided by the promotion and marketing service and/or a merchant. Consumers may include, without limitation, individuals, groups of individuals, corporations, other merchants, and the like.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. Promotions may have different values in different contexts. For example, a promotion may have a first value associated with the cost paid by a consumer, known as an "accepted value." When redeemed, the promotion may be used to purchase a "promotional value" representing the retail price of the goods. The promotion may also have a "residual value," reflecting the remaining value of the promotion after expiration. Although consumers may be primarily focused on the accepted and promotional value of the promotion, a promotion may also have additional associated values. For example, a "cost value" may represent the cost to the merchant to offer the promotion via the promotion and marketing service, where the promotion and marketing service receives the cost value for each promotion sold to a consumer. The promotion may also include a "return on investment" value, representing a quantified expected return on investment to the merchant for each promotion sold.

For example, consider a promotion offered by the promotion and marketing service for a $50 meal promotion for $25 at a particular restaurant. In this example, $25 would be the accepted value charged to the consumer. The consumer would then be able to redeem the promotion at the restaurant for $50 applied toward their meal check. This $50 would be the promotional value of the promotion. If the consumer did not use the promotion before expiration, the consumer might be able to obtain a refund of $22.50, representing a 10% fee to recoup transaction costs for the merchant and/or promotion and marketing service. This $22.50 would be the residual value of the promotion. If the promotion and marketing service charged the merchant $3.00 to offer the promotion, the $3.00 fee would be the "cost value." The "return on investment" value of the promotion might be dynamically calculated by the promotion and marketing service based on the expected repeat business generated by the marketing of the promotion, the particular location, the demographics of the consumer, and the like. For example, the return on investment value might be $10.00, reflecting the long term additional profit expected by the merchant as a result of bringing in a new customer through use of a promotion.

Promotions may be provided to consumers and redeemed via the use of an "instrument." Instruments may represent and embody the terms of the promotion from which the instrument resulted. For example, instruments may include, but are not limited to, any type of physical token (e.g., magnetic strip cards or printed barcodes), virtual account balance (e.g., a promotion being associated with a particular user account on a merchant website), secret code (e.g., a character string that can be entered on a merchant website or point-of-sale), tender, electronic certificate, medium of exchange, voucher, or the like which may be used in a transaction for at least a portion of the purchase, acquisition, procurement, consumption or the like of goods, services and/or experiences as defined by the terms of the promotion.

In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned restaurant as the example provider, an electronic indication in a mobile application that shows $50 of value to be used as payment for a meal check at the restaurant. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "redemption" refers to the use, exchange or other presentation of an instrument for at least a portion of a good, service or experience as defined by the instrument and its related promotion. In some examples, redemption includes the verification of validity of the instrument. In other example embodiments, redemption may include an indication that a particular instrument has been redeemed and thus no longer retains an actual, promotional and/or residual value (e.g., full redemption). In other example embodiments, redemption may include the redemption of at least a portion of its actual, promotional and/or residual value (e.g., partial redemption). An example of redemption, using the aforementioned restaurant as the example provider, is the exchange of the $50 instrument and $50 to settle a $100 meal check.

As used herein, the term "impression" refers to a metric for measuring how frequently consumers are provided with marketing information related to a particular good, service, or promotion. Impressions may be measured in various different manners, including, but not limited to, measuring the frequency with which content is served to a consumer (e.g., the number of times images, websites, or the like are requested by consumers), measuring the frequency with which electronic marketing communications including particular content are sent to consumers (e.g., a number of e-mails sent to consumers or number of e-mails including particular promotion content), measuring the frequency with which electronic marketing communications are received by consumers (e.g., a number of times a particular e-mail is read), or the like. Impressions may be provided through various forms of media, including but not limited to communications, displays, or other perceived indications, such as e-mails, text messages, application alerts, mobile applications, other type of electronic interface or distribution channel and/or the like, of one or more promotions.

As used herein, the term "electronic marketing information" refers to various electronic data and signals that may be interpreted by a promotion and marketing service to provide improved electronic marketing communications. Electronic marketing information may include, without limitation, clickstream data (defined below), transaction data (defined below), location data (defined below), communication channel data (defined below), discretionary data (defined below), or any other data stored by or received by the promotion and marketing service for use in providing electronic communications to consumers.

As used herein, the term "clickstream data" refers to electronic information indicating content viewed, accessed, edited, or retrieved by consumers. This information may be electronically processed and analyzed by a promotion and marketing service to improve the quality of electronic marketing and commerce transactions offered by, through, and in conjunction with the promotion and marketing service. It should be understood that the term "clickstream" is not intended to be limited to mouse clicks. For example, the clickstream data may include various other consumer interactions, including without limitation, mouse-over events and durations, the amount of time spent by the consumer viewing particular content, the rate at which impressions of particular content result in sales associated with that content, demographic information associated with each particular consumer, data indicating other content accessed by the consumer (e.g., browser cookie data), the time or date on which content was accessed, the frequency of impressions for particular content, associations between particular consumers or consumer demographics and particular impressions, and/or the like.

As used herein, the term "transaction data" refers to electronic information indicating that a transaction is occurring or has occurred via either a merchant or the promotion and marketing service. Transaction data may also include information relating to the transaction. For example, transaction data may include consumer payment or billing information, consumer shipping information, items purchased by the consumer, a merchant rewards account number associated with the consumer, the type of shipping selected by the consumer for fulfillment of the transaction, or the like.

As used herein, the term "location data" refers to electronic information indicating a particular location. Location data may be associated with a consumer, a merchant, or any other entity capable of interaction with the promotion and marketing service. For example, in some embodiments location data is provided by a location services module of a consumer mobile device. In some embodiments, location data may be provided by a merchant indicating the location of consumers within their retail location. In some embodiments, location data may be provided by merchants to indicate the current location of the merchant (e.g., a food truck or delivery service). It should be appreciated that location data may be provided by various systems capable of determining location information, including, but not limited to, global positioning service receivers, indoor navigation systems, cellular tower triangulation techniques, video surveillance systems, or radio frequency identification (RFID) location systems.

As used herein, the term "communication channel data" refers to electronic information relating to the particular device or communication channel upon which a merchant or consumer communicates with the promotion and marketing service. In this regard, communication channel data may include the type of device used by the consumer or merchant (e.g., smart phone, desktop computer, laptop, netbook, tablet computer), the Internet Protocol (IP) address of the device, the available bandwidth of a connection, login credentials used to access the channel (e.g., a user account and/or password for accessing the promotion and marketing service), or any other data pertaining to the communication channel between the promotion and marketing service and an entity external to the promotion and marketing service.

As used herein, the term "discretionary data" refers to electronic information provided by a merchant or consumer explicitly to the promotion and marketing service in support of improved interaction with the promotion and marketing service. Upon registering with the promotion and marketing service or at any time thereafter, the consumer or merchant may be invited to provide information that aids the promotion and marketing service in providing services that are targeted to the particular needs of the consumer or merchant. For example, a consumer may indicate interests, hobbies, their age, gender, or location when creating a new account. A merchant may indicate the type of goods or services provided, their retail storefront location, contact information, hours of operation, or the like.

It should be appreciated that the term "discretionary data" is intended to refer to information voluntarily and explicitly provided to the promotion and marketing service, such as by completing a form or survey on a website or application hosted by the promotion and marketing service. However, is should be appreciated that the examples of discretionary data provided above may also be determined implicitly or through review or analysis of other electronic marketing information provided to the promotion and marketing service. It should also be appreciated that the promotion and marketing service may also gate access to certain features or tools based on whether certain discretionary data has been provided. For example, the consumer may be required to provide information relating to their interests or location during a registration process.

As used herein, the term "offering parameters" refers to terms and conditions under which the promotion is offered by a promotion and marketing service to consumers. These offering parameters may include parameters, bounds, considerations and/or the like that outline or otherwise define the terms, timing, constraints, limitations, rules or the like under which the promotion is sold, offered, marketed, or otherwise provided to consumers. Example offering parameters include, using the aforementioned restaurant as the example provider, limit one instrument per person, total of 100 instruments to be issued, a run duration of when the promotion will be marketed via the promotion and marketing service, and parameters for identifying consumers to be offered the promotion (e.g., factors influencing how consumer locations are used to offer a promotion).

As used herein, the term "redemption parameters" refers to terms and conditions for redeeming or otherwise obtaining the benefit of promotions obtained from a promotion and marketing service. The redemption parameters may include parameters, bounds, considerations and/or the like that outline the term, timing, constraints, limitations, rules or the like for how and/or when an instrument may be redeemed. For example, the redemption parameters may include an indication that the instrument must be redeemed prior to a specified deadline, for a specific good, service or experience and/or the like. For example, using the aforementioned restaurant as the example provider, the redemption parameters may specify a limit of one instrument per visit, that the promotion must be used in store only, or that the promotion must be used by a certain date.

As used herein, the term "promotion content" refers to display factors or features that influence how the promotion is displayed to consumers. For example, promotion content may include an image associated with the promotion, a narrative description of the promotion or the merchant, a display template for association with the promotion, or the like. Various other factors may be used to generate the promotion offer, such as the success of the promotion offers generated by the merchants with similar characteristics, the product availability of the merchant, and the like.

As used herein, the term "promotion component" is used to refer to elements of a particular promotion that may be selected during a promotion generation process. Promotion components may include any aspect of a promotion, including but not necessarily limited to offering parameters, redemption parameters, and promotion content. For example, promotion components may include, but are not limited to, promotion titles, promotion ledes (e.g., a short text phrase displayed under a promotion title), promotion images, promotion prices, promotion discount levels, promotion style sheets, promotion fonts, promotion e-mail subjects, promotion quantities, promotion fine print options, promotion fees assessed to the merchant by the promotion and marketing service, or the like. Promotion components may also include various flags and settings associated with registration and verification functions for a merchant offering the promotion, such as whether the identity of the merchant has been verified, whether the merchant is registered with the promotion and marketing service, or the like.

As used herein, the term "electronic marketing communication" refers to any electronically generated information content provided by the promotion and marketing service to a consumer for the purpose of marketing a promotion, good, or service to the consumer. Electronic marketing communications may include any email, short message service (SMS) message, web page, application interface, or the like electronically generated for the purpose of attempting to sell or raise awareness of a product, service, promotion, or merchant to the consumer.

It should be appreciated that the term "electronic marketing communication" implies and requires some portion of the content of the communication to be generated via an electronic process. For example, a telephone call made from an employee of the promotion and marketing service to a consumer for the purpose of selling a product or service would not qualify as an electronic marketing communication, even if the identity of the call recipient was selected by an electronic process and the call was dialed electronically, as the content of the telephone call is not generated in an electronic manner. However, a so-called "robo-call" with content programmatically selected, generated, or recorded via an electronic process and initiated by an electronic system to notify a consumer of a particular product, service, or promotion would qualify as an electronic marketing communication. Similarly, a manually drafted e-mail sent from an employee of the promotion and marketing service to a consumer for the purpose of marketing a product would not qualify as an electronic marketing communication. However, a programmatically generated email including marketing materials programmatically selected based on electronic marketing information associated with the recipient would qualify as an electronic marketing communication.

As used herein, the term "business analytic data" refers to data generated by the promotion and marketing service based on electronic marketing information to assist with the operation of the promotion and marketing service and/or one or more merchants. The various streams of electronic marketing information provided to and by the promotion and marketing service allow for the use of sophisticated data analysis techniques that may be employed to identify correlations, relationships, and other associations among elements of electronic marketing information. These associations may be processed and formatted by the promotion and marketing service to provide reports, recommendations, and services both internal to the promotion and marketing service and to merchants in order to improve the process by which merchants and promotion and marketing service engage with consumers. For example, the promotion and marketing service may analyze the electronic marketing information to identify an increased demand for a particular product or service, and provide an electronic report to a merchant suggesting the merchant offer the particular product or service. Alternatively, the promotion and marketing service may identify that a particular product or service is not selling or resulting in the merchant losing money, customers, or market share (e.g., after consumers order a particular menu item, they never come back to the merchant), and suggest that the merchant should discontinue offering that product or service.

It should be appreciated that the term "business analytic data" is intended to refer to electronically and programmatically generated data. For example, a printed report or letter manually drafted by an employee of the promotion and marketing service would not be said to include business analytic data, even if said data was used by the employee during the drafting process, while a data disk or downloaded file containing analytics generated by the promotion and marketing service would be considered business analytic data.

As used herein, the term "item" refers to products, goods, services, and/or promotions as sold by a promotion and marketing service or other e-commerce system. Items may be tangible (e.g. goods, physical gift cards, physical certificates) or intangible (e.g., electronic codes, account credits).

Technical Underpinnings and Implementation of Exemplary Embodiments

Merchants, including manufacturers, wholesalers, and retailers, have spent a tremendous amount of time, money, manpower, and other resources to determine the best way to market their products to consumers. Whether a given marketing effort is successful is often determined based on the return-on-investment offered to the merchant from increased awareness, sales, and the like of the merchant's goods and services in exchange for the resources spent on the marketing effort. In other words, optimal marketing techniques generally maximize the benefit to the merchant's bottom line while minimizing the cost spent on marketing. To this end, a merchant's marketing budget may be spent in a variety of different manners including advertising, offering of discounts, conducting market research, and various other known marketing techniques. The end goal of these activities is to ensure that products are presented to consumers in a manner that maximizes the likelihood that the consumers will purchase the product from the merchant that performed the marketing activities while minimizing the expense of the marketing effort.

The advent of electronic commerce has revolutionized the marketing process. While merchants would typically have to perform costly market research such as focus groups, surveys, and the like to obtain detailed information on consumer preferences and demographics, the digital age has provided a wealth of new consumer information that may be used to optimize the marketing and sales process. As a result, new technologies have been developed to gather, aggregate, analyze, and report information from a variety of electronic sources.

So-called "clickstream data" provides a robust set of information describing the various interactions consumers have with electronic marketing communications provided to them by merchants and others. Promotion and marketing services have been developed with sophisticated technology to receive and process this data for the benefit of both merchants and consumers. These services assist merchants with marketing their products to interested consumers, while reducing the chance that a consumer will be presented with marketing information in which the consumer has no interest. Some promotion and marketing services further leverage their access to a trove of electronic marketing information to assist merchants and consumers with other tasks, such as offering improved merchant point-of-sale systems, improved inventory and supply chain management, improved methods for delivering products, and the like.

Unlike conventional marketing techniques related to the use of paper or other physical media (e.g., coupons clipped from a weekly newspaper), promotion and marketing services offer a wealth of additional electronic solutions to improve the experience for consumers and merchants. The ability to closely monitor user impressions provides the ability for the promotion and marketing service to gather data related to the time, place, and manner in which the consumer engaged with the impression (e.g., viewed, clicked, moused-over) and obtained and redeemed the promotion. The promotion and marketing service may use this information to determine which products are most relevant to the consumer's interest and to provide marketing materials related to said products to the consumer, thus improving the quality of the electronic marketing communications received by the consumer. Merchants may be provided with the ability to dynamically monitor and adjust the parameters of promotions offered by the promotion and marketing service, ensuring that the merchant receives a positive return on their investment. For example, the merchant can closely monitor the type, discount level, and quantity sold of a particular promotion on the fly, while with traditional printed coupons the merchant would not be able to make any changes to the promotion after the coupon has gone to print. Each of these advancements in digital market and promotion distribution involve problems unique to the digital environment not before seen in traditional print or television broadcast marketing.

However, these promotion and marketing services are not without problems. Although electronic marketing information provides a wealth of information, the inventors have determined that existing techniques may not always leverage this information in an efficient or accurate manner. Technology continues to rapidly advance in the field of analytics and the processing of this information, offering improved data gathering and analysis techniques, resulting in more relevant and accurate results provided in a more efficient manner. Electronic marketing services continue to evolve and provide improved methods for engaging consumers and spreading awareness of products offered by promotion and marketing services.

In many cases, the inventors have determined that these services are constrained by technological obstacles unique to the electronic nature of the services provided, such as constraints on data storage, machine communication and processor resources. The inventors have identified that the wealth of electronic marketing information available to these services and the robust nature of electronic marketing communications techniques present new challenges never contemplated in the world of paper coupons and physical marketing techniques. The inventors have further determined that even technological methods that leverage computers for statistical analysis and consumer behavior modeling (e.g., television rating systems) fail to address problems associated with providing relevant, high quality electronic marketing communications (e.g., impressions) to consumers in a manner that maximizes accuracy, minimizes error, is user friendly and provides for efficient allocation of resources. Embodiments of the present invention as described herein serve to correct these errors and offer improved resource utilization, thus providing improvements to electronic marketing services that address problems arising out of the electronic nature of those services.

The advent of the Internet has brought new techniques for targeted advertising to the forefront. Automated systems have been developed that observe consumer behavior and sentiment, and dynamically select and generate outgoing communications that are targeted to that particular consumer or based on other consumers with similar characteristics of the particular consumer. These techniques leverage computing technology in novel ways to receive data about the consumer and to dynamically and programmatically generate appropriate content for that consumer.

Such systems may employ various algorithms and processes that attempt to identify items which are most likely to be relevant to the particular consumer at any given time. For example, during a consumer's interaction with an electronic commerce page, the page may include "suggested items" which somehow relate to the item that is the subject of the electronic commerce page (e.g., "Frequently Purchased Together" items). Other algorithms and processes may identify items that are identified as likely to be of particular interest to the consumer based on the consumer's identified hobbies, past purchases, or the like. Yet further programmatic tools for identifying items may identify items based on locations, such as the location of the consumer or the location of an item being viewed.

However, such techniques are inflexible. While some systems may exist that allow a consumer to view "items within a particular radius", "trending items", or "items identified for me", each of these techniques suffers in that identifying of items according to the selected criteria eliminates the consideration of other potential criteria. Using such systems with multiple criteria (e.g., constrained based on a zip code and popularity) would require multiple inputs from the consumer, an act few consumers are likely to perform in order to improve the advertisements provided to them.

These various techniques for identifying items also often lack transparency to the consumer. A consumer may be presented with a list of items with little context for why those items were identified as relevant. Even recommendation systems that utilize multiple factors and notify consumers of why particular factors were chosen (e.g., "Because you liked product X, we chose this item", or "Because you like this genre of film, we suggest this item") do not allow for the consumer to modify the actual recommendation algorithm itself.

Recognizing these problems and other problems related to item recommendation engines, the inventors have developed a flexible, straightforward system that allows consumers to easily update recommendation algorithms used to recommend items to improve the quality of item recommendations, while providing transparency in the update process and also minimizing the level of interaction required to obtain improved item recommendations. In particular, the inventors have realized that improved item recommendations may be provided by allowing consumers to interact with the recommendation algorithm directly (e.g., the particular weights and factors used to make the recommendations) rather than the data set upon which the algorithm operates (e.g., the user profile, locations, item data, and other data processed by the algorithm). In this manner, embodiments of the present invention allow the user to dynamically adjust the weights of different factors employed in a recommendation algorithm through a novel recommendation engine and client interface. The client interface may also function to provide the consumer with information about particular items (e.g., an e-commerce interface) in addition to including interface controls that, when selected, cause an indication of a weight adjustment to be transmitted to a recommendation engine. The recommendation engine may receive this indication, adjust the weights for particular factors of a recommendation algorithm accordingly, and execute the recommendation engine with the adjusted weights to generate a new set of item recommendations, which are provided to the consumer via the client interface.

Embodiments of the present invention may be employed, for example, in applications that generate outgoing electronic communications, such as web servers, email servers, and the like. These servers may employ embodiments to dynamically alter the content of outgoing electronic communications to include items identified by improved recommendation engines. These servers may also be configured to receive indications of factor weight adjustments from client interfaces for interacting with the electronic communications, and cause updated item recommendations to be provided to the client interfaces based on the factor weight adjustments.

System Architecture

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile terminals, such as a portable digital assistant (PDA), mobile telephone, smartphone, laptop computer, tablet computer, or any combination of the aforementioned devices.

In this regard, FIG. 1 discloses an example computing system within which embodiments of the present invention may operate. Merchants may access a promotion and marketing service 102 via a network 112 (e.g., the Internet, or the like) using computer devices 108A through 108N and 110A through 110N, respectively (e.g., one or more consumer devices 108A-108N or one or more merchant devices 110A-110N). The promotion and marketing service 102 may function to manage item inventories as described herein and below. Moreover, the promotion and marketing service 102 may comprise a server 104 in communication with one or more databases, such as a database 106.

The server 104 may be embodied as a computer or computers as known in the art. The server 104 may provide for receiving of electronic data from various sources, including but not necessarily limited to the consumer devices 108A-108N and the merchant devices 110A-110N. For example, the server 104 may be operable to receive and process clickstream data provided by the consumer devices 108 and/or the merchant devices 110. The server 104 may also facilitate e-commerce transactions based on transaction data provided by the consumer devices 108 and/or the merchant devices 110. The server 104 may facilitate the generation and providing of various electronic marketing communications and marketing materials based on the received electronic marketing information.

The database 106 may be embodied as a data storage device such as a Network Attached Storage (NAS) device or devices, or as a separate database server or servers. The database 106 includes information accessed and stored by the server 104 to facilitate the operations of the promotion and marketing service 102. For example, the database 106 may include, without limitation, user account credentials for system administrators, merchants, and consumers, data indicating the products offered by the promotion and marketing service, electronic marketing information, analytics, reports, financial data, and/or the like.

The consumer devices 108A-108N may be any computing device as known in the art and operated by a consumer. Electronic data received by the server 104 from the consumer devices 108A-108N may be provided in various forms and via various methods. For example, the consumer devices 108A-108N may include desktop computers, laptop computers, smartphones, netbooks, tablet computers, wearables, and the like. The information may be provided through various sources on these consumer devices.

In embodiments where a consumer device 108 is a mobile device, such as a smart phone or tablet, the consumer device 108 may execute an "app" to interact with the promotion and marketing service 102. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 8®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of consumers. In some embodiments, a mobile operating system may also provide for improved communication interfaces for interacting with external devices (e.g., home automation systems, indoor navigation systems, and the like). Communication with hardware and software modules executing outside of the app is typically provided via application programming interfaces (APIs) provided by the mobile device operating system.

The promotion and marketing service 102 may leverage the application framework offered by the mobile operating system to allow consumers to designate which information is provided to the app and which may then be provided to the promotion and marketing service 102. In some embodiments, consumers may "opt in" to provide particular data to the promotion and marketing service 102 in exchange for a benefit, such as improved relevancy of marketing communications offered to the user. In some embodiments, the consumer may be provided with privacy information and other terms and conditions related to the information provided to the promotion and marketing service 102 during installation or use of the app. Once the consumer provides access to a particular feature of the mobile device, information derived from that feature may be provided to the promotion and marketing service 102 to improve the quality of the consumer's interactions with the promotion and marketing service.

For example, the consumer may indicate that they wish to provide location information to the app from location services circuitry included in their mobile device. Providing this information to the promotion and marketing service 102 may enable the promotion and marketing service 102 to offer promotions to the consumer that are relevant to the particular location of the consumer (e.g., by providing promotions for merchants proximate to the consumer's current location). It should be appreciated that the various mobile device operating systems may provide the ability to regulate the information provided to the app associated with the promotion and marketing service 102. For example, the consumer may decide at a later point to disable the ability of the app to access the location services circuitry, thus limiting the access of the consumer's location information to the promotion and marketing service 102.

Various other types of information may also be provided in conjunction with an app executing on the consumer's mobile device. For example, if the mobile device includes a social networking feature, the consumer may enable the app to provide updates to the consumer's social network to notify friends of a particularly interesting promotion. It should be appreciated that the use of mobile technology and associated app frameworks may provide for particularly unique and beneficial uses of the promotion and marketing service through leveraging the functionality offered by the various mobile operating systems.

Additionally or alternatively, the consumer device 108 may interact through the promotion and marketing service 102 via a web browser. As yet another example, the consumer device 108 may include various hardware or firmware designed to interface with the promotion and marketing service 102 (e.g., where the consumer device 108 is a purpose-built device offered for the primary purpose of communicating with the promotion and marketing service 102, such as a store kiosk).

The merchant devices 110A-110N may be any computing device as known in the art and operated by a merchant. For example, the merchant devices 110A-110N may include a merchant point-of-sale, a merchant local marketing device, a merchant e-commerce server, a merchant inventory system, or a computing device accessing a web site designed to provide merchant access (e.g., by accessing a web page via a browser using a set of merchant account credentials). The merchant devices 110A-110N may also be mobile devices as described above with respect to the consumer devices 108A-108N.

Electronic data received by the promotion and marketing service 102 from the merchant devices 110A-110N may also be provided in various forms and via various methods. For example, the merchant devices 110A-110N may provide real-time transaction and/or inventory information as purchases are made from the merchant. In other embodiments, the merchant devices 110A-110N may be employed to provide information to the promotion and marketing service 102 to enable the promotion and marketing service 102 to generate promotions or other marketing information to be provided to consumers.

An example of a data flow for exchanging electronic marketing information among one or more consumer devices, merchant devices, and the promotion and marketing service is described below with respect to FIG. 3.

Example Apparatuses for Implementing
Embodiments of the Present Invention

The server 104 may be embodied by one or more computing systems, such as apparatus 200 shown in FIG. 2. As illustrated in FIG. 2, the apparatus 200 may include a processor 202, a memory 204, input/output circuitry 206, communications circuitry 208, recommendation circuitry 210, feedback circuitry 212, and interface generation circuitry 214. The apparatus 200 may be configured to execute the operations described above with respect to FIG. 1 and below with respect to FIGS. 4-7. Although these components 202-214 are described with respect to functional limitations, it should be understood that the particular implementations necessarily include the use of particular hardware. It should also be understood that certain of these components 202-214 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processors, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The recommendation circuitry 210 includes hardware configured to employ one or more algorithms, processes, techniques, or systems to recommend items to consumers. These techniques may include, but are not limited to, machine learning techniques, predictive models, relevancy engines, and any other process for determining that particular items are associated with or likely to be of interest to particular consumers. The techniques employed to recommend items may include employing algorithms that ascribe weights to one or more factors used to generate a score or other metric for a given item. These weights may be dynamically determined by other components of the system (e.g., the feedback circuitry 212) to modify, adjust, add, or delete these weights based on feedback received via an interface. The recommendation circuitry 210 may use these adjusted weights in item recommendation operations.

These item recommendations may be provided to various other components, processes, or modules of a promotion and marketing system for use in other operations of the promotion and marketing system. For example, the recommendation circuitry 210 may provide item recommendations to the interface generation circuitry 214, which in turn generates one or more electronic marketing communications that include interfaces for informing a recipient consumer of the recommended items. Alternatively, in some embodiments the recommendation circuitry 210 may determine recommended items for various other purposes, such as maintaining a table or other data structure of recommended items for particular consumers.

The recommendation circuitry 210 may generate one or more item recommendations by executing the recommendation processes described herein using a processor, such as the processor 202. However, it should also be appreciated that, in some embodiments, the recommendation circuitry 210 may include a separate processor, specially configured field programmable gate array (FPGA), or application specific interface circuit (ASIC) to generate item recommendations. In some embodiments, the recommendation circuitry 210 also includes components for storing recommendations in a database. Such components may include a memory, such as the memory 204. The recommendation circuitry 210 may communicate with other components of the system and/or external systems via a network or bus interface provided by the communications circuitry 208, such as to transmit recommended items to other components of the system. The recommendation circuitry 210 is therefore implemented using hardware components of the apparatus configured by either hardware or software for implementing these planned functions.

The feedback circuitry 212 includes hardware configured to receive feedback indicating an adjustment to one or more weights for one or more factors employed by the recommendation circuitry 210 to generate one or more item recommendations. The feedback circuitry 212 may receive one or more weight adjustment indicators which indicate a particular factor to be adjusted. For example, a weight adjustment indicator may be received that requests an increase to a weight ascribed to a "locality" factor, a "popularity" factor, a "personalization" factor, or various other factors associated with one or more recommendation processes. The weight adjustment indicator may indicate an increase or decrease to a particular numeric weight applied to a particular factor. For example, the weight adjustment indicator may indicate a fixed increase or decrease to the weight (e.g., a constant value added or subtracted to the weight), a multiplier (e.g., a percentage increase or decrease), or various other adjustments to the weight (e.g., determining the adjustment to the weight based on a number of weight adjustment indicators received, such that the adjustment is larger for each successive weight adjustment indicator). In some embodiments, adjusting one weight upward may adjust other weights downward by a corresponding amount in order to keep the overall set of weights at a constant value. Each factor may be associated with a "factor score" that represents the numeric value associated with that particular factor. Each item may be associated with an "item score" that is derived from one or more of the factor scores.

To receive and apply the weight adjustment indicator to the weights used by the recommendation circuitry, the feedback circuitry 212 may be operable to receive signals from one or more client interfaces provided by the interface generation circuitry 214. For example, a web page interface generated by the interface generation circuitry 214 may include one or more interface controls that, when selected, cause generation of a weight adjustment indicator, such as hyperlinks, JavaScript controls, or the like. The feedback circuitry 212 may monitor for these weight adjustment indicators (e.g., by monitoring for network traffic or other messages received by the communications circuitry 208) and adjust the weights as weight adjustment indicators are received. The feedback circuitry 212 may process weight adjustment indicators and adjust weights for factors used in algorithms by the recommendation circuitry 210 using a processor, such as the processor 202. However, it should also be appreciated that, in some embodiments, the feedback circuitry 212 may include a separate processor, specially configured field programmable gate array (FPGA), or application specific interface circuit (ASIC) to manage the offering of promotions via a promotion and marketing service. The feedback circuitry 212 may, as noted above, utilize one or more network interfaces offered by the communications circuitry 208 to receive or detect weight adjustment indicators, though in some embodiments weight adjustment indicators may be received in communication with the interface generation circuitry 214 (e.g., where the interface generation circuitry 214 includes a web server component that detects interaction with particular interface controls on a generated web page, email, or the like). The feedback circuitry 212 is therefore implemented using hardware components of the apparatus configured by either hardware or software for implementing these planned functions.

The interface generation circuitry 214 includes hardware configured to generate an interface that provides one or more item recommendations along with one or more interface controls for generating weight adjustment indicators that are processed by the feedback circuitry. The interface generation circuitry 214 may, for instance, include various systems for generating emails, text messages, dynamic web pages, or the like which include both item recommendations and interface controls for generating weight adjustment indicators. For example, the item transmission circuitry 216 may include a system for generating a web page including marketing materials related to a set of recommended items, along with interface controls for modifying weights applied to factors used by the algorithm that recommended those items. In some embodiments, the interface generation circuitry 214 may be or include a slot manager, embodiments of which are described in co-pending U.S. patent application Ser. No. 14/219,349, entitled "Method and Apparatus for Generating an Electronic Communication" filed on Mar. 19, 2014, the entire contents of which are hereby incorporated by reference in their entirety.

The interface generation circuitry 214 may be operable to generate a request to the recommendation circuitry 210 to obtain one or more item recommendations for an outgoing electronic communication. In response to the request, the interface generation circuitry 214 may receive the item recommendations. In some embodiments, the response to the request may also include a list of factors used to generate those item recommendations, and the interface generation circuitry 214 may programmatically generate interface controls for each factor based on the request. These generated interface controls may, upon selection, generate a weight adjustment indicator for their corresponding control. Alternatively, in some embodiments the factors and interface controls may be static, or hard-coded if the factors used to generate the item recommendations are predefined. The interface generation circuitry 214 may thus function to generate an interface that includes one or more item recommendations along with interface controls for adjusting weights applied to factors used by an algorithm to generate those item recommendations.

The interface may be provided to a client, such as a consumer device. The interface may thus include, for example, a web page, email, or the like. Such a web page may include images, hyperlinks, JavaScript controls, or other interface elements for displaying the item recommendations and receiving input (e.g., mouse clicks) to select an interface control to cause a weight adjustment indicator to be sent. As noted above, the weight adjustment indicator may take the form of various messages or network traffic, such as, for example, the interface generation circuitry 214 detecting a "hit" at a particular uniform resource locator (e.g., where the interface controls are hyperlinks), a particular message provided by JavaScript (e.g., where the interface controls are implemented by JavaScript), or the like.

The interface generation circuitry 214 may generate the interface by using or in conjunction with a processor, such as the processor 202. However, it should also be appreciated that, in some embodiments, the interface generation circuitry 214 may include a separate processor, specially configured field programmable gate array (FPGA), or application specific interface circuit (ASIC) to manage the transmission of one or more items via one or more electronic marketing communications. The interface generation circuitry 216 may transmit electronic marketing communications and communicate with other components of the system and/or external systems via a network interface provided by the communications circuitry 208. The interface generation circuitry 214 is therefore implemented using hardware components of the apparatus configured by either hardware or software for implementing these planned functions.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by example displays described herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Electronic Marketing Information Service Data Flow

FIG. 3 depicts an example data flow 300 illustrating interactions between a server 302, one or more consumer devices 304, and one or more merchant devices 306. The server 302 may be implemented in the same or a similar fashion as the server 104 as described above with respect to FIG. 1 and/or the apparatus 200 described above with respect to FIG. 2, the one or more consumer devices 304 may be implemented in the same or a similar fashion as the consumer devices 108A-108N as described above with respect to FIG. 1, and the one or more merchant devices 306 may be implemented in the same or a similar fashion as the merchant devices 110A-110N as described above with respect to FIG. 1.

The data flow 300 illustrates how electronic information may be passed among various systems when employing a server 302 in accordance with embodiments of the present invention. The one or more consumer devices 304 and/or one or more merchant devices 306 may provide a variety of electronic marketing information to the server 302 for use in providing promotion and marketing services to the consumer. This electronic marketing information may include, but is not limited to, location data, clickstream data, transaction data, communication channel data, and/or discretionary data.

As a result of transactions performed between the one or more consumer devices 304 and the server 302, the server 302 may provide fulfillment data to the consumer devices. The fulfillment data may include information indicating whether the transaction was successful, the location and time the product will be provided to the consumer, instruments for redeeming promotions purchased by the consumer, or the like.

In addition to the e-commerce interactions with the one or more consumer devices 304 offered by the server 302, the server 302 may leverage information provided by the consumer devices to improve the relevancy of electronic marketing communications to individual consumers or groups of consumers. In this manner, the server 302 may determine promotions, goods, and services that are more likely to be of interest to a particular consumer or group of consumers based on clickstream data, location data, and other information provided by and/or relating to particular consumers. For example, the server 302 may detect the location of a consumer based on location data provided by the consumer device, and offer promotions based on the proximity of the consumer to the merchant associated with those promotions.

Alternatively, the server 302 may note that the consumer has an interest in a particular hobby (e.g., skiing) based on electronic marketing information associated with the consumer (e.g., a browser cookie that indicates they frequently visit websites that provide snowfall forecasts for particular ski resorts), and offer promotions associated with that hobby (e.g., a promotion offering discounted ski equipment rentals or lift tickets). It should be appreciated that a variety of different types of electronic marketing information could be provided to the server 302 for the purpose of improving the relevancy of marketing communications. It should also be appreciated that this electronic marketing information may be received from a variety of electronic sources, including various consumer devices, merchant devices, and other sources both internal and external to a promotion and marketing service. For example, other data sources may include imported contact databases maintained by merchants, electronic survey questions answered by consumers, and/or various other forms of electronic data.

It should also be appreciated that the server 302 may also control other factors of the electronic marketing communications sent to the consumer other than the particular promotions included in the electronic marketing communication. For example, the server 302 may determine the form, structure, frequency, and type of the electronic marketing communication. As with the content of the electronic marketing communication, these factors may be programmatically determined according to various methods, factors, and processes based on electronic data received by the server 302 for the purpose of maximize the likelihood that the communication will be relevant to the recipient consumer.

In particular, embodiments of the present invention may employ a recommendation engine that uses a variety of signals to identify particular items for insertion into one or more electronic marketing communications. The recommendation engine may employ one or more processes, algorithms, or other techniques that use these signals to generate scores which, in turn, are used to select particular items as recommended items. Metrics may be derived from each signal, with different weights applied to those metrics. Those metrics may be used to generate the scores. Embodiments of the present invention may provide mechanisms for consumers to provide weight adjustment indicators that change the weights of factors employed by the recommendation engine to recommend items.

The server 302 interactions with the one or more merchant devices 306 may be related to enabling the merchant to market their products using a promotion and marketing service. For example, the one or more merchant devices 306 may provide promotion data defining one or more promotions to be offered by the promotion and marketing service on behalf of the merchant. The server 302 may receive this information and generate information for providing such promotions via an e-commerce interface, making the promotions available for purchase by consumers. The server 302 may also receive information about products from the one or more merchant devices 306. For example, a merchant may provide electronic marketing information indicating particular products, product prices, inventory levels, and the like to be marketed via a promotion and marketing service. The server 302 may receive this information and generate listing information to offer the indicating products to consumers via a promotion and marketing service.

The one or more merchant devices 306 may also receive information from the server 302. For example, in some embodiments a merchant may obtain access to certain business analytic data aggregated, generated, or maintained by the server 302. As a particular example, a merchant might offer to pay for consumer demographic data related to products or services offered by the merchant. It should be appreciated however, that a merchant may not need to list any products or services via the promotion and marketing service in order to obtain such data. For example, the promotion and marketing service may enable merchants to access electronic marketing data offered via the promotion and marketing service based on a subscription model.

The one or more merchant devices 306 may also receive electronic compensation data from the server 302. For example, when a promotion or product is sold by the promotion and marketing service on behalf of the merchant, a portion of the received funds may be transmitted to the merchant. The compensation data may include information sufficient to notify the merchant that such funds are being or have been transmitted. In some embodiments, the compensation data may take the form of an electronic wire transfer directly to a merchant account. In some other embodiments, the compensation data may indicate that a promotion or product has been purchased, but the actual transfer of funds may occur at a later time. For example, in some embodiments, compensation data indicating the sale of a promotion may be provided immediately, but funds may not be transferred to the merchant until the promotion is redeemed by the consumer.

Embodiments advantageously provide for improvements to the server 302 by providing a feedback mechanism by which consumers may dynamically adjust the weights applied to particular factors used in generating recommended items. In this manner, embodiments offered improved electronic interfaces that allow for direct interaction with a recommendation engine. These improvements serve to allow consumers to directly adjust the algorithms and processes used by the recommendation engine to recommend items, thereby improving the quality and relevancy of those recommendations.

Example Interactions for Providing an Interactive Recommendation Engine

FIG. 4 illustrates an example data flow 400 for providing an interactive recommendation engine as a component of a promotion and marketing service in accordance with some embodiments of the present invention. The data flow 400 illustrates interactions among database components of a promotion and marketing service, including item data 408, consumer data 410, item rating data 412, an inventory management system 406, a recommendation system 402, and a client interface 404. The recommendation system 402 may function to score items listed in the item data 408, such that the highest scoring items are selected as recommended items. To determine those scores, the recommendation system 402 may generate metrics (e.g., numeric values) for different factors, such as location (e.g., where higher scores indicate items associated with a location that is closer to the consumer), item rating (e.g., where items with better reviews or consumer ratings have higher scores), personal relevance (e.g., where items having direct associations with a consumer profile receive higher scores), popularity (e.g., where scores are determined based on purchase volumes or page views), or the like.

The recommendation system 402 may include one or more external data interfaces 414 and a recommendation engine 418 that utilizes algorithms or processes to generate item recommendations using a set of factor weights 416. The external data interfaces 414 may include application programming interfaces, buses, network interface cards, and other hardware and software for communicating with various datastores, such as the item data 408, the consumer data 410, the item rating data 412, and the inventory management system 406.

The item data 408 includes data about various items available for recommendation. This data may include, for example, item names, item categories, item sub-categories, item prices, text narratives associated with items, images, discount levels, sales data, or any other data related to, identifying, or associated with items offered by a promotion and marketing system.

The consumer data 410 includes data that indicates particular preferences of particular consumers, including their past purchases, items with which those consumers have interacted, consumer hobbies and interests, consumer locations, and other information about particular consumers.

The item rating data 412 includes ratings, reviews, and other data about items listed in the item data 408. These ratings may be in the form of "star" ratings (e.g., ratings out of a total of 5), ratings on a 0 to 10 scale, ratings on a 0 to 100 scale, or the like. Ratings may be supplied directly by consumers (e.g., where consumers provide a score through online forms or rating sites), or derived from sentiment analysis and/or natural language processing (e.g., where consumers provide narrative reviews). In some embodiments, ratings may be provided by consumers directly to the promotion and marketing system, while in other embodiments ratings may be provided on various external systems (e.g., external websites).

The inventory management system 406 may be a system or module of the promotion and marketing system that manages, tracks, and/or predicts item inventory levels to ensure that items recommended by the recommendation system 402 are available in inventory for purchase and likely to continue to remain available in inventory for a particular period of time before being considered by the recommendation system 402. Example embodiments of an inventory management system 406 are described further in U.S. patent application Ser. No. 14/881,723 filed on Oct. 13, 2015 and entitled "METHOD AND APPARATUS FOR MANAGING ITEM INVENTORIES", which is herein incorporated by reference in its entirety.

The external data interfaces 414 may serve to aggregate, clean, and filter data received from the data sets. To this end, prior to providing data to the recommendation engine, the external data interfaces 414 may convert data from disparate data sets into a normalized numeric scale, cull items that lack sufficient inventory to justify inclusion as a recommended item, normalize ratings for particular items or item categories (e.g., some item categories may lend themselves to narrower rating scales than others), and the like. Some embodiments may group items with similar attributes or attribute values and perform data processing on grouped items. For example, a given set of similar items may be grouped with other items of similar prices, categories, expiration dates, and/or other attributes such that the volume of data for such items is increased for use by the recommendation engine. Upon recommending an item from a particular group, the recommendation engine may randomly select an item from a selected group as opposed to selecting a particular item.

After smoothing, aggregating, cleaning, and/or filtering the data received from the disparate data sets accessed by the eternal data interfaces 414, the external data interfaces 414 may provide this data to a recommendation engine 418. The recommendation engine 418 may receive these data signals and generate a set of item recommendations by generating scores for items based on those data signals. For example, algorithms may apply weights to each score and then add the scores together to determine a total score for the item. In some embodiments, the weights act as multipliers for each signal, such that a signal may be emphasized or deemphasized by increasing or decreasing the corresponding weight.

The recommendation engine 418 may generate a set of item recommendations 422 which are provided to a consumer as part of a client interface 404. For example, the recommendation engine 418 may transmit the item recommendations 422 to a system (not shown) that inserts the item recommendations into a web page or other electronic marketing communication. The web page or other electronic marketing communication may be provided as a client interface 404 that includes both the set of item recommendations 422 and a set of recommendation feedback controls 420.

The set of recommendation feedback controls 420 may provide a mechanism for the receiving consumer to adjust the factor weights 416 used to generate the set of item recommendations 422 by the recommendation engine 418. For example, the client interface 404 may include a separate interface control for each signal used by the recommendation engine 418. An illustration of an example of such a client interface is described further below with respect to FIG. 5.

Selection of that interface control may cause a weight adjustment indicator to be sent from the client interface to the recommendation system 402. In response to receiving the weight adjustment indicator, the recommendation system 402 may alter the weight factor associated with the interface control. For example, the weight may be increased by a fixed amount (e.g., incremented by 0.1, 0.5, or 1), multiplied by a fixed amount (e.g., a 5 percent, 10 percent, or 25 percent increase), or increased by a variable amount (e.g., increased by 5 percent for the first selection of the interface control, 10 percent for the second selection of the same interface control, and 25 percent for the third selection of the same interface control). An example of an embodiment of a process for providing a weight adjustment indicator using a client interface is described further below with respect to FIG. 7.

In some embodiments, receiving a weight adjustment indicator may trigger a recalculation of the recommended items by the recommendation engine 418 using the adjusted weights. For example, the recommendation engine 418 may rescore one or more items using the adjusted weights. After recalculating the recommended items, a new set of recommended items 422 may be provided via the client interface, taking into account the newly adjusted weights. An example of an embodiment of a process for providing item recommendations in this manner is described further below with respect to FIG. 6.

Example of a Client Interface for Interacting with a Dynamic Recommendation System FIG. 5 depicts an example illustration of a client interface 500 for receiving item recommendations and providing interface controls for adjusting one or more weights used in generating item recommendations in accordance with embodiments of the present invention. The client interface 500 includes a set of item recommendations 504 and a set of weight adjustment interface controls 502. The weight adjustment interface controls 502 may include a first interface control 506 associated with an item ratings weight (e.g., emphasizing the impact of product reviews and ratings on the recommendation algorithm), a second interface control 508 associated with a "top selling" weight (e.g., emphasizing the impact of the rate of sale of items on the recommendation algorithm), and a third interface control 510 associated with a "personalized" weight (e.g., emphasizing the impact of the relevance of the particular item to the particular user on the recommendation algorithm). Selection of the one of the interface controls 506-510 may be performed by, for example, a mouse click on the interface control, the use of a keyboard, touchscreen, or other input device on the interface control, or any mechanism for interacting with an electronic interface. Selection of one of the interface controls may cause the client interface 500 to generate a weight adjustment indicator which is transmitted to a recommendation system.

Upon selecting one of the interface controls 506-510 and transmitting the weight adjustment indicator to the recommendation system, the client interface 500 may receive updated item recommendations from the recommendation system. In such a case, the set of item recommendations 504 may be updated to include the new item recommendations generated using the adjusted factor weights changed in response to the weight adjustment indicator generated by the selection of one or more of the interface controls 506-510.

Examples of Processes for Implementing a Dynamic Recommendation System

FIG. 6 illustrates an example of a process 600 for generating item recommendations using a dynamic recommendation process in accordance with embodiments of the present invention. The process 600 may be performed by components of a recommendation system, such as described above with respect to FIGS. 2 and 4. The process 600 may be employed by a promotion and marketing system to provide item recommendations to consumers using algorithms that are operable to receive consumer input via a client interface to alter the weights of factors employed to generate the recommendations. Embodiments therefore advantageously provide a mechanism by which consumers may alter the manner in which item recommendations are generated. The process 600 may be performed by, for example, a recommendation system 402 as described with respect to FIG. 4 or components of an apparatus 200 as described with respect to FIG. 2.

At action 602, an item catalog and an aggregated set of item data is received. As noted above, the item catalog may be a list of items, such as a set of item data 408 as described with respect to FIG. 4. The aggregated set of item data may be item data such as item ratings, item sales metrics, and other data suitable for generating a set of item recommendations. In some embodiments, the aggregated set of item data may also include consumer information, such as consumer profile information.

At action 604, the received set of items are filtered to remove invalid, out of stock, or other unavailable items. For example, embodiments may utilize an inventory management system to determine whether certain items are out of stock or low on stock. These items may be removed from the item catalog prior to the recommendation operation to prevent them from being considered as valid possible recommendations.

At action 606, a plurality of factors are determined for use as part of an item recommendation operation. These factors may be determined based on a particular algorithm or algorithms used to perform the recommendation operation, based on availability of appropriate data (e.g., a valid interface existing between a database that stores data relevant to that particular factor), or the like.

At action 608, weights are determined for each of the plurality of factors. The weights may be determined based on a set of predetermined values. In some embodiments, a default set of weights is used to generate an initial set of recommended items, and then the default weights are adjusted based on weight adjustment indicators received from a client interface.

At action 610, a set of item recommendations are generated using the determined weights. For example, generating the set of item recommendations may include computing scores for each item based on multiple different signals, such as a score for a location of the item in relation to a location of a consumer, a score based on ratings the item has received, a score based on sale metrics of the item, or the like. These scores may be adjusted based on the weights and combined to determine a single score for each item. Top items (e.g., a top "n" number of items, or items with scores that exceed a certain threshold) may be identified as recommended items.

At action 612, a weight adjustment indicator is received. The weight adjustment indicator may be provided by a client interface that includes one or more interface controls for altering the weights applied to different factors used to generate the item recommendations. For example, a web page interface may include the items recommended at action 610 along with a set of interface controls for modifying those weights, such as described above with respect to FIG. 5.

At action 614, the weights are modified in accordance with the received weight adjustment indicator. As noted above, adjusting the factor weights may be performed in a variety of manners, including adjusting the weights by static amounts, multiplying by a constant, or increasing the amount of adjustment with each successive adjustment.

At action 616, the modified weights are employed by the recommendation engine to generate a new set of recommended items. For example, adjusting one or more weights may have an impact on the recommendation process, resulting in different items being recommended. Accordingly, embodiments of the process 600 provide mechanisms for dynamically adjusting an item recommendation algorithm.

FIG. 7 illustrates an example of a process for using a client interface to generate weight adjustment indicators in accordance with embodiments of the present invention. The process 700 may be performed by a client device (e.g., a consumer device) in communication with components of a recommendation system, such as described above with respect to FIGS. 2 and 4. The process 700 may be employed by a client interface to notify a recommendation engine of weight adjustment indicators in order to alter a recommendation algorithm used to generate item recommendations displayed by the client interface. Embodiments therefore advantageously provide a mechanism by which consumers may alter the manner in which item recommendations are generated. The process 700 may be performed by, for example, a client interface as described with respect to FIG. 4, a consumer device 108 as described with respect to FIG. 1, or components of an apparatus 200 as described with respect to FIG. 2.

At action 702, an interface is generated comprising one or more boost interface controls and a set of item recommendations. For example, the generated interface may be a web page rendered in a web browser, an email rendered in an email client, or the like. The boost interface controls may be, for example, buttons, hyperlinks, or other interface controls. The boost interface controls may be labeled with text, icons, or other indications of which factors their selection will adjust in the recommendation algorithm.

At action 704, an indication of selection of one of the boost interface controls is received. The indication of selection may be, for example, a mouse click, a keystroke, a touch screen input, a voice command, or any other input mechanism for interacting with the boost interface control.

At action 706, a weight adjustment indicator is generated based on the selection of the boost interface control. The weight adjustment indicator may be, for example, a network message, data packet, URL access operation, or any other technique of notifying a recommendation engine of selection of one of the boost interface controls to cause an adjustment in a weight of a recommendation algorithm.

At action 708, the weight adjustment indicator is transmitted to the recommendation engine, such as over a network. At action 710, a set of updated item recommendations may be received in response to the recommendation engine receiving the weight adjustment indicator. The updated item recommendations may reflect the change in weights indicated by the weight adjustment indicator. In this manner, the set of item recommendations may be revised based on the modified algorithm in response to the consumer selection.

As will be appreciated, computer program code and/or other instructions may be loaded onto a computer, processor or other programmable apparatus's circuitry to produce a machine, such that execution of the code on the machine by the computer, processor, or other circuitry creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or a combination of software and hardware. Furthermore, embodiments may take the form of a computer program product on at least one computer-readable storage medium having computer-readable program instructions (e.g., computer software) embodied in the storage medium. Any suitable computer-readable storage medium may be utilized, including non-transitory hard disks, CD-ROMs, flash memory, optical storage devices, magnetic storage devices, or the like.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus to produce a machine, such that the computer program product includes the instructions which execute on the computer or other programmable data processing apparatus create a means for implementing the functions specified in the flowchart block or blocks.

These computer program instructions may also be stored in a computer-readable storage device that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus, thereby producing a computer-implemented process such that the instructions executed on the computer or other programmable apparatus cause performance of the steps and thereby implement the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for generating electronic marketing communications, the method comprising:
   receiving, by a processor, electronic data indicating a set of items;
   generating, using a recommendation engine executing on the processor, a first set of one or more item recommendations for the user profile from the set of items, the recommendation engine employing a recommendation algorithm that determines the first set of one or more item recommendations by at least:
      generating, by the processor for each item of the set of one or more items, a factor score for each factor of a plurality of factors associated with the set of items;
      applying, by the processor, a first plurality of weights for the plurality of factors;
      adjusting, by the processor, the factor score for at least one factor of the plurality of factors using at least one weight of the first plurality of weights associated with the plurality of factors to generate one or more adjusted factor scores; and
      determining, by the processor, an item score for each item of the one or more items of the set of items using the adjusted factor scores;
   transmitting, by the processor and to a client device, a client interface to be displayed at the client device, the client interface comprising at least the first set of one or more item recommendations, a first interface control to facilitate adjustment of a first weight for a first factor, and a second interface control to facilitate adjustment of a second weight for a second factor from the plurality of factors,
   wherein first user input data embodying a user engagement of the first interface control via the client interface of the client device causes a first weight adjustment indication to be transmitted to the recommendation engine to facilitate the adjustment of the first weight, and wherein second user input data embodying user engagement of the second interface control via the client interface of the client device causes a second weight adjustment indication to be transmitted to the recommendation engine to facilitate the adjustment of the second weight;
   receiving, by the processor and in response to the first user input data embodying user engagement of the first interface control via the client interface of the client device, the first weight adjustment indication;
   adjusting, by the processor, the first weight for the recommendation algorithm to generate an adjusted plurality of weights for the recommendation algorithm;
   generating, using the recommendation engine executing on the processor, a second set of one or more item recommendations using the adjusted plurality of weights, the second set of one or more item recommendations differing from the first set of one or more item recommendations by at least one item recommendation, and the second set of one or more item recommendations including a new item recommendation generated based on the adjusted plurality of weights, wherein generating the second set of item recommendations comprises:
      generating an item grouping of the set of items, wherein the item grouping comprises a plurality of items that share at least one attribute;
      selecting to recommend the item grouping based at least in part on the adjusted plurality of weights;
      randomly selecting the one or more item recommendations from the item grouping; and
   transmitting, by the processor and to the client device, the second set of one or more item recommendations for display via the client interface or a second client interface.

2. The method of claim 1, further comprising causing the second set of one or more item recommendations to be presented via the client interface.

3. The method of claim 1, wherein adjusting the first weight comprises multiplying the first weight by a percentage value.

4. The method of claim 1, further comprising determining an inventory level prior to generating the first set of one or more item recommendations.

5. The method of claim 1, wherein the plurality of factors comprise at least one of a location score, a sales metric score, and a user profile score.

6. The method of claim 1, further comprising storing an adjusted weight from the adjusted plurality of weights with the user profile.

7. The method of claim 1, wherein the client interface is dynamically updated from the first set of one or more item recommendations to the second set of one or more item recommendations in response to the user engagement of the first interface control or the user engagement of the second interface control.

8. The method of claim 1, wherein the adjusting of the first weight causes adjusting of at least one other weight for at least one other factor of the plurality of factors.

9. The method of claim 1, wherein the first weight adjustment indication is associated with a first adjustment amount, and the method further comprising:
   receiving an additional first weight adjustment indication in response to a single click, tap, voice command, key press, or peripheral button press of the first interface control via the client interface; and
   generating an adjusted first factor weight corresponding to the first factor based at least in part on a second adjustment amount, wherein the second adjustment amount is larger than the first adjustment amount based at least in part on receiving the additional first weight adjustment indication subsequent to the first weight adjustment indication.

10. The method of claim 1, wherein the first weight adjustment indication is associated with an adjustment amount, and the method further comprising:
receiving an additional first weight adjustment indication in response to an engagement comprising a single click, tap, voice command, key press, or peripheral button press of the first interface control via the client interface; and
generating an adjusted first factor weight corresponding to the first factor based at least in part on the adjustment amount,
wherein the adjustment amount is fixed for each engagement of the first interface control.

11. The method of claim 1, wherein receiving the first weight adjustment indication comprises:
monitoring network traffic; and
detecting the first weight adjustment indication in the network traffic.

12. The method of claim 1, wherein receiving the first weight adjustment indication comprises:
detecting a hit at a particular uniform resource locator corresponding to the first weight adjustment indication.

13. The method of claim 1, wherein receiving the first weight adjustment indication comprises:
receiving a message indicating input of a single click, tap, voice command, key press, or peripheral button press of the first interface control via the client interface.

14. The method of claim 1, wherein the first interface control is configured to transmit the first weight adjustment indication in response to a single click, tap, voice command, key press, or peripheral button press engaging the first interface control, and wherein the second interface control is configured to transmit a second weight adjustment indication in response to a second single click, tap, voice command, key press, or peripheral button press engaging the second interface control.

15. The method of claim 1, further comprising:
receiving, by the processor and from a plurality of distinct computing devices external to a promotion and marketing service, electronic marketing information associated with a user profile, wherein the electronic marketing information is generated by one or more consumer devices associated with the user profile or at least one distinct computing device of the plurality of distinct computing devices external to the promotion and marketing service in response to at least one user interaction between the one or more consumer devices associated with the user profile and the at least one distinct computing device of the plurality of distinct computing devices external to the promotion and marketing service.

16. An apparatus for generating electronic marketing communications, the apparatus comprising:
recommendation circuitry configured to:
receive electronic data indicating a set of items;
generate a first set of one or more item recommendations for the user profile from the set of items by employing a recommendation algorithm that determines the first set of one or more item recommendations, wherein to generate the first set of one or more item recommendations the recommendation circuitry is configured to at least:
generate, for each item of the set of one or more items, a factor score for each factor of a plurality of factors associated with the set of items;
apply a first plurality of weights for the plurality of factors;
adjust the factor score for each factor using at least one weight of the first plurality of weights associated with the plurality of factors to generate one or more adjusted factor scores; and
determine an item score for each item of the one or more items of the set of items using the adjusted factor scores;
adjust the first weight in response to a first weight adjustment indication to generate an adjusted plurality of weights for the recommendation algorithm; and
generate a second set of one or more item recommendations using the adjusted plurality of weights, wherein the second set of one or more item recommendations differs from the first set of one or more item recommendations by at least one item recommendation, and wherein the second set of one or more item recommendations includes a new item recommendation generated based on the adjusted plurality of weights, wherein to generate the second set of item recommendations the recommendation circuitry is configured to:
generate an item grouping of the set of items, wherein the item grouping comprises a plurality of items that share at least one attribute;
select to recommend the item grouping based at least in part on the adjusted plurality of weights;
randomly select the one or more item recommendations from the item grouping; and
interface generation circuitry configured to:
transmit a client interface to a client device to be displayed at the client device, the client interface comprising the first set of one or more item recommendations, a first interface control to facilitate adjustment of the first weight for a first factor, and a second interface control to facilitate adjustment of a second weight for a second factor from the plurality of factors,
wherein first user input data embodying user engagement of the first interface control via the client interface of the client device causes the first weight adjustment indication to be transmitted to the recommendation circuitry to facilitate the adjustment of the first weight, and wherein second user input data embodying user engagement of the second interface control via the client interface of the client device causes a second weight adjustment indication to be transmitted to the recommendation circuitry to facilitate the adjustment of the second weight; and
transmit the second set of one or more item recommendations for display via the client interface or a second client interface; and
feedback circuitry configured to:
receive at least the first weight adjustment indication in response to the first user input data embodying user engagement of the first interface control; and
provide at least the first weight adjustment indication to the recommendation circuitry.

17. The apparatus of claim 16, wherein the set of items is filtered by an inventory management system to determine an inventory level prior to generating the first set of one or more item recommendations.

18. An apparatus for generating electronic marketing communications, the apparatus comprising:
- means for receiving electronic data indicating a set of items;
- means for generating a first set of one or more item recommendations for the user profile from the set of items by employing a recommendation algorithm that determines the first set of one or more item recommendations by at least:
  - generating, for each item of the set of one or more items, a factor score for each factor of a plurality of factors associated with the set of items;
  - applying a first plurality of weights for the plurality of factors, the plurality of factors;
  - adjusting the factor score for at least one factor of the plurality of factors using at least one weight of the first plurality of weights associated with the plurality of factors to generate one or more adjusted factor scores; and
  - determining an item score for each item of the one or more items of the set of items using the adjusted factor scores;
- means for transmitting to a client device a client interface to be displayed at the client device, the client interface comprising the first set of one or more item recommendations, a first interface control to facilitate adjustment of the first weight for a first factor, and a second interface control to facilitate adjustment of a second weight for a second factor from the plurality of factors, wherein first user input data embodying user engagement of the first interface control via the client interface of the client device causes a first weight adjustment indication to be transmitted to the apparatus to facilitate the adjustment of the first weight, and wherein second user input data embodying user engagement of the second interface control via the client interface of the client device causes a second weight adjustment indication to be transmitted to the apparatus to facilitate the adjustment of the second weight;
- means for receiving at least the first weight adjustment indication in response to the first user input data embodying user engagement of the first interface control via the client interface of the client device;
- means for adjusting the first weight associated with the first weight adjustment indication to generate an adjusted plurality of weights for the recommendation algorithm;
- means for generating a second set of one or more item recommendations using the adjusted plurality of weights, the second set of one or more item recommendations differing from the first set of one or more item recommendations by at least one item recommendation, and the second set of one or more item recommendations including a new item recommendation generated based on the adjusted plurality of weights, wherein generating the second set of item recommendations comprises:
  - means for generating an item grouping of the set of items, wherein the item grouping comprises a plurality of items that share at least one attribute;
  - means for selecting to recommend the item grouping based at least in part on the adjusted plurality of weights;
  - means for randomly selecting the one or more item recommendations from the item grouping; and
- means for transmitting, to the client device, the second one or more item recommendations.

19. The apparatus of claim 18, wherein the means for causing the client interface to be generated is further configured to cause the second set of one or more item recommendations to be presented via the client interface.